US012809160B2

(12) United States Patent
Arai et al.

(10) Patent No.: US 12,809,160 B2
(45) Date of Patent: Nov. 24, 2026

(54) OPTICAL APPARATUS HAVING COMPONENT THAT ROTATES MIRROR, CONTROL METHOD OF OPTICAL APPARATUS, AND STORAGE MEDIUM

(71) Applicant: CANON KABUSHIKI KAISHA, Tokyo (JP)

(72) Inventors: Masato Arai, Tokyo (JP); Teruyuki Higashiyama, Kanagawa (JP); Tatsuya Kimoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 304 days.

(21) Appl. No.: 18/628,998

(22) Filed: Apr. 8, 2024

(65) Prior Publication Data

US 2024/0361588 A1 Oct. 31, 2024

(30) Foreign Application Priority Data

Apr. 26, 2023 (JP) ................................. 2023-072049

(51) Int. Cl.
*G02B 26/10* (2006.01)
*G02B 26/08* (2006.01)

(52) U.S. Cl.
CPC ....... *G02B 26/101* (2013.01); *G02B 26/0816* (2013.01); *G02B 26/105* (2013.01)

(58) Field of Classification Search
CPC .... G02B 26/10; G02B 26/101; G02B 26/105; G02B 26/0816; G02B 17/0678; G02B 17/0689; G02B 17/0872; G02B 17/088; G02B 23/02; G02B 23/06; G02B 23/08; G01S 17/00; G01S 17/02; G01S 17/04; G01S 17/06; G01S 17/42; G01S 17/88; G01S 17/89; G01S 17/93–933; G01C 1/02; G01C 15/002–006
See application file for complete search history.

(56) References Cited

U.S. PATENT DOCUMENTS 3,653,774 A * 4/1972 La Roche ................ G01C 1/02 356/255
2015/0042977 A1* 2/2015 Siercks ................. G01S 7/4817 356/4.01
2023/0328195 A1 10/2023 Higashiyama

FOREIGN PATENT DOCUMENTS

JP 2017-156142 A 9/2017
JP 2017-166841 A 9/2017

* cited by examiner

*Primary Examiner* — Stephone B Allen
*Assistant Examiner* — Adam W Booher
(74) *Attorney, Agent, or Firm* — Carter, DeLuca & Farrell LLP

(57) ABSTRACT

An optical apparatus includes a mirror configured to irradiate light onto a target and to guide reflected light from the target, a first motor configured to rotate the mirror about a first axis, a second motor configured to rotate the mirror about a second axis, and a processor configured to control the first motor and the second motor. An intersection of the first axis and a reflective surface of the mirror is located at a position different from the second axis. A reflection optical axis surface including a reflection optical axis as an optical axis of the reflected light passing through the intersection of the reflective surface is not parallel to a plane including the second axis.

12 Claims, 7 Drawing Sheets

OPTICAL APPARATUS HAVING COMPONENT THAT ROTATES MIRROR, CONTROL METHOD OF OPTICAL APPARATUS, AND STORAGE MEDIUM

BACKGROUND

Technical Field

One of the aspects of the embodiments relates to an optical apparatus having a component that rotates a mirror, a control method of an optical apparatus, and a storage medium.

Description of Related Art

Laser radar devices that use a laser beam, so-called three-dimensional laser scanners, have conventionally been known for measuring three-dimensional distances to a target (or object). The three-dimensional laser scanner emits a laser beam onto the target, measures the distance to the target using the reflected light from the target, and calculate the coordinate values (three-dimensional coordinate values) in a three-dimensional coordinate system by adding information about the laser beam irradiating direction to the measured distance. The three-dimensional laser scanner calculates three-dimensional coordinate values multiple times while changing the laser beam irradiating direction onto the target, acquires a plurality of coordinate values (point cloud data), and measures the shape of the target using the acquired point cloud data.

Japanese Patent Laid-Open No. 2017-156142 discloses a three-dimensional laser scanner configured to change the laser beam irradiating direction by rotating a mirror in the horizontal and vertical directions. Japanese Patent Laid-Open No. 2017-156142 discloses a method of acquiring high-density point cloud data by setting the rotational speed such that a value of R1/R2 is an even number, where R1 is a rotational speed of rotating the mirror in the vertical direction, and R2 is a rotational speed of rotating the mirror in the horizontal direction.

Japanese Patent Laid-Open No. 2017-166841 discloses a measuring apparatus configured to rotate a mirror at a speed lower than that of the performance of a motor by repeatedly turning on and off the motor driving, since the motor has a speed limit on the low-speed side. By rotating the mirror at a low speed and by acquiring the point cloud data, an interval between adjacent point clouds becomes shorter, and the high-density point cloud data can be acquired.

In the three-dimensional laser scanner such as that disclosed in Japanese Patent Laid-Open No. 2017-156142, a scanning line of the point cloud that is zigzag as illustrated in FIG. 7B causes the point cloud data to have uneven density in the horizontal direction. In the configuration where the point cloud density is increased by rotating the mirror at a low speed by repeating turning on and off of the motor driving as in Japanese Patent Laid-Open No. 2017-166841, the mirror does not rotate at a constant speed and thus the interval of adjacent point cloud data does not become constant.

SUMMARY

An optical apparatus according to one aspect of the disclosure includes a mirror configured to irradiate light onto a target and to guide reflected light from the target, a first motor configured to rotate the mirror about a first axis, a second motor configured to rotate the mirror about a second axis, and a processor configured to control the first motor and the second motor. An intersection of the first axis and a reflective surface of the mirror is located at a position different from the second axis. A reflection optical axis surface including a reflection optical axis as an optical axis of the reflected light passing through the intersection of the reflective surface is not parallel to a plane including the second axis. A control method of the above optical apparatus also constitutes another aspect of the disclosure. A non-transitory computer-readable storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
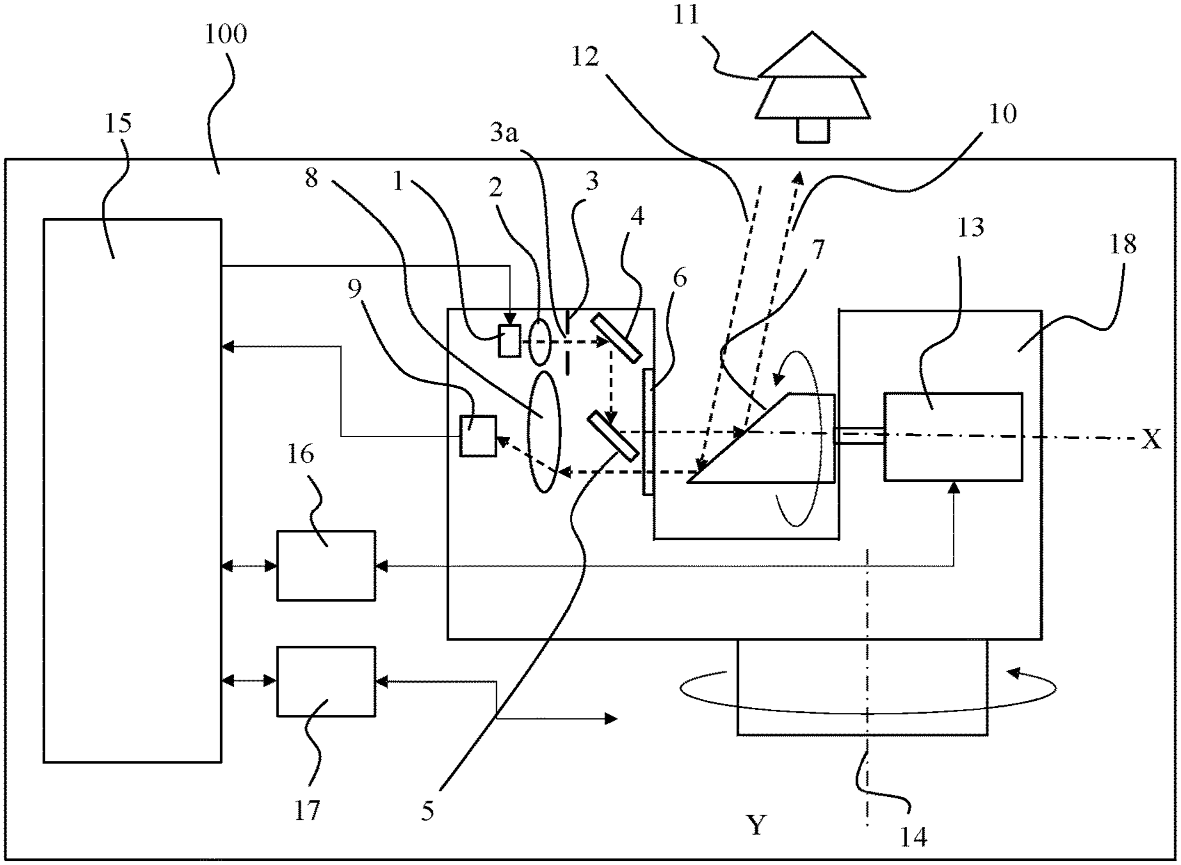
FIG. 1 is a block diagram of a three-dimensional laser scanner according to a first embodiment.

A description will now be given of a first embodiment. Referring now to FIG. 1, a description will be given of a three-dimensional laser scanner (optical apparatus) 100 according to this embodiment. FIG. 1 is a block diagram of the three-dimensional laser scanner 100. In this embodiment, a three-dimensional laser scanner 100 serves as an example of an optical apparatus, but this embodiment is not limited to this example, and is applicable to another optical apparatus.

A light emitter that irradiates a target area with light includes a semiconductor laser (light source) 1 that emits a laser beam 10, a condenser lens 2 that adjusts a beam shape of the laser beam 10 in the target area to a desired shape, and a fixed aperture stop 3 that shields unnecessary light of the laser beam 10. The laser beam 10 emitted from the semiconductor laser 1 is projected through an aperture 3*a* in a fixed aperture stop 3, is reflected by a first fixed mirror 4 and a second fixed mirror 5 to change its direction, transmits through a protective glass 6, is reflected by a rotary mirror (mirror, reflective member) 7, and is irradiated onto the target area.

The configuration of a light receiver that receives reflected light or scattered light from a target 11 within the target area is as follows: The laser beam 10 irradiated onto the target area returns to the rotary mirror 7 as reflected light 12 from the target 11. The reflected light 12 reflected by the rotary mirror 7 passes through the protective glass 6, is guided by a condenser lens 8, and is guided to a light receiving element (light receiver) 9. The light receiving element 9 receives the reflected light guided by the rotary mirror 7 and outputs distance data to the target 11 (three-dimensional position data of the target 11). The rotary mirror 7 is rotated in a first direction (vertical direction, about the X-axis) by a first driver (first driving unit, first motor) 13 having a motor having an encoder configured to detect a rotational position, and changes an irradiation direction of the laser beam 10 to a perpendicular direction of the target area.

A housing 18 that holds the light emitter and the light receiver is rotated in a second direction (horizontal direction, about the Y-axis) by a second driver (second driving unit, second motor) 14 that includes a motor having an encoder configured to detect a rotational position. The laser beam 10 is rotated to change the irradiation direction of the laser beam 10 to the horizontal direction of the target area.

A control unit 15 controls the semiconductor laser 1, the light receiving element 9, the first driver 13, and the second driver 14. The control unit 15 includes a Central Processing Unit (CPU) serving as a computer, and a memory (storage unit) that stores a computer program. The CPU controls each component in the semiconductor laser 1, the light receiving element 9, the first driver 13, and the second driver 14 by executing the computer program stored in the memory.

The control unit 15 drives each of the semiconductor laser 1, the first driver 13, and the second driver 14 at a predetermined driving voltage and a predetermined driving frequency. The control unit 15 detects and stores the vertical and horizontal positions at which the semiconductor laser 1 is irradiated, and measures the received light waveform at a specific frequency when the light receiving element 9 receives light. The control unit 15 also measures a difference between the light reception time (light reception timing) obtained by the light receiving element 9 and the light emission time (light emission timing) of the semiconductor laser 1, or the phase of the light reception signal obtained by the light receiving element 9 and the phase of the output signal of the semiconductor laser 1. The control unit 15 then obtains distance data to the target 11 by multiplying the measured difference by the light speed.

The control unit 15 controls the first driver 13 using a first motor driver 16 in order to irradiate the target area with the laser beam 10 in the vertical scanning direction. The control unit 15 controls the second driver 14 using a second motor driver 17 in order to irradiate the target area with the laser beam 10 in the horizontal scanning direction. The control unit 15, the first motor driver 16, and the second motor driver 17 may be built in the housing 18.

Figure 2A:
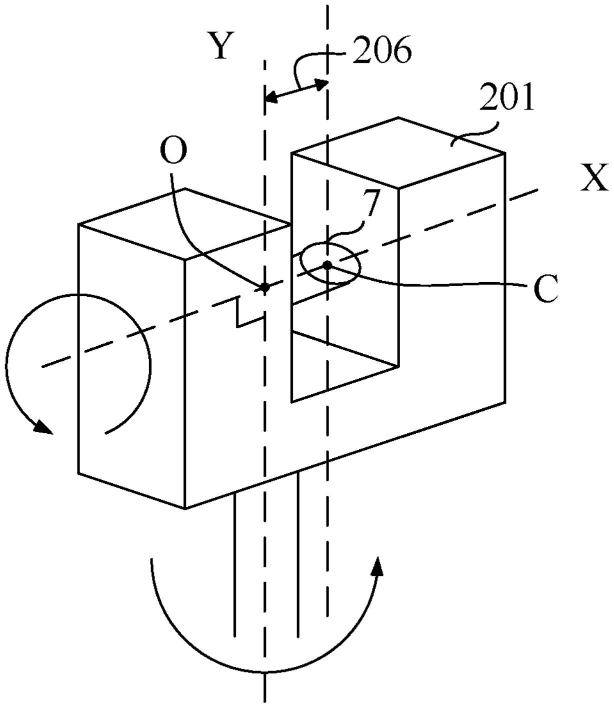
FIGS. 2A and 2B illustrate a positional relationship among a rotary mirror, a housing, and a laser beam in the first embodiment.
Figure 2B:
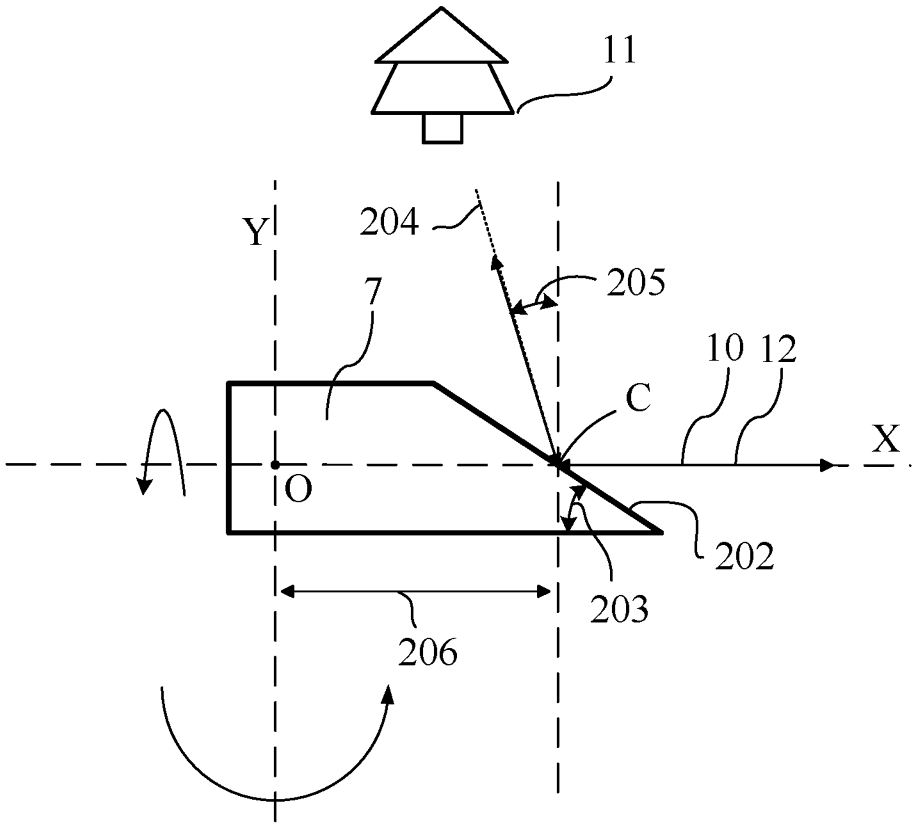

Referring now to FIGS. 2A and 2B, a description will be given of a positional relationship among the rotary mirror 7, the housing 18, and the laser beam 10 in this embodiment. FIG. 2A illustrates a positional relationship between the rotary mirror 7 and a housing 201. FIG. 2B illustrates a positional relationship between the rotary mirror 7 and the laser beam 10. The rotary mirror 7 rotates about the horizontal rotation axis (X-axis, first axis). The rotary mirror 7 is disposed so that the center point C of a mirror plane (reflective surface) 202 is disposed in the housing 201 at a position that shifts in the X-axis direction from a point (intersection O of the X-axis and the Y-axis) on the vertical rotation axis (Y-axis, second axis) by a predetermined distance illustrated as an offset 206. Thus, the center point C is an intersection of the X axis and the mirror plane 202 and is located at a position different from the Y-axis.

A description will now be given of a mirror plane angle 203 and the offset 206. A mirror plane 202 of the rotary mirror 7 has the mirror plane angle 203 that is set to an arbitrary angle. Thereby, the incident angle and reflection angle of the laser beam 10 and the reflected light 12 can be determined according to the mirror plane angle 203. That is, in a plane including the X-axis (first axis) and the Y-axis (second axis), an angle formed by the Y-axis (second axis) and a reflection optical axis 204 of the reflected light passing through the center point C of the mirror plane 202 is a reflection optical axis angle 205 that changes according to the mirror plane angle 203.

A trajectory surface including the reflection optical axis 204 passing through the center point C of the mirror plane 202 while the rotary mirror 7 is rotated by 360 degrees about the X-axis will be defined as a reflection optical axis surface. As long as the reflection optical axis angle 205 has a value other than 0°, the reflection optical axis surface is not parallel to the plane including the Y-axis. In addition, by shifting, by the arbitrary offset 206, the center point C on the mirror plane 202 at which the laser beam 10 and the reflected light 12 are reflected, from the point O where the X-axis and the Y-axis are orthogonal to each other, the center point C of the mirror plane 202 is not located on the Y-axis (the center point C of the mirror plane 202 shifts from the Y-axis).

Figure 3:
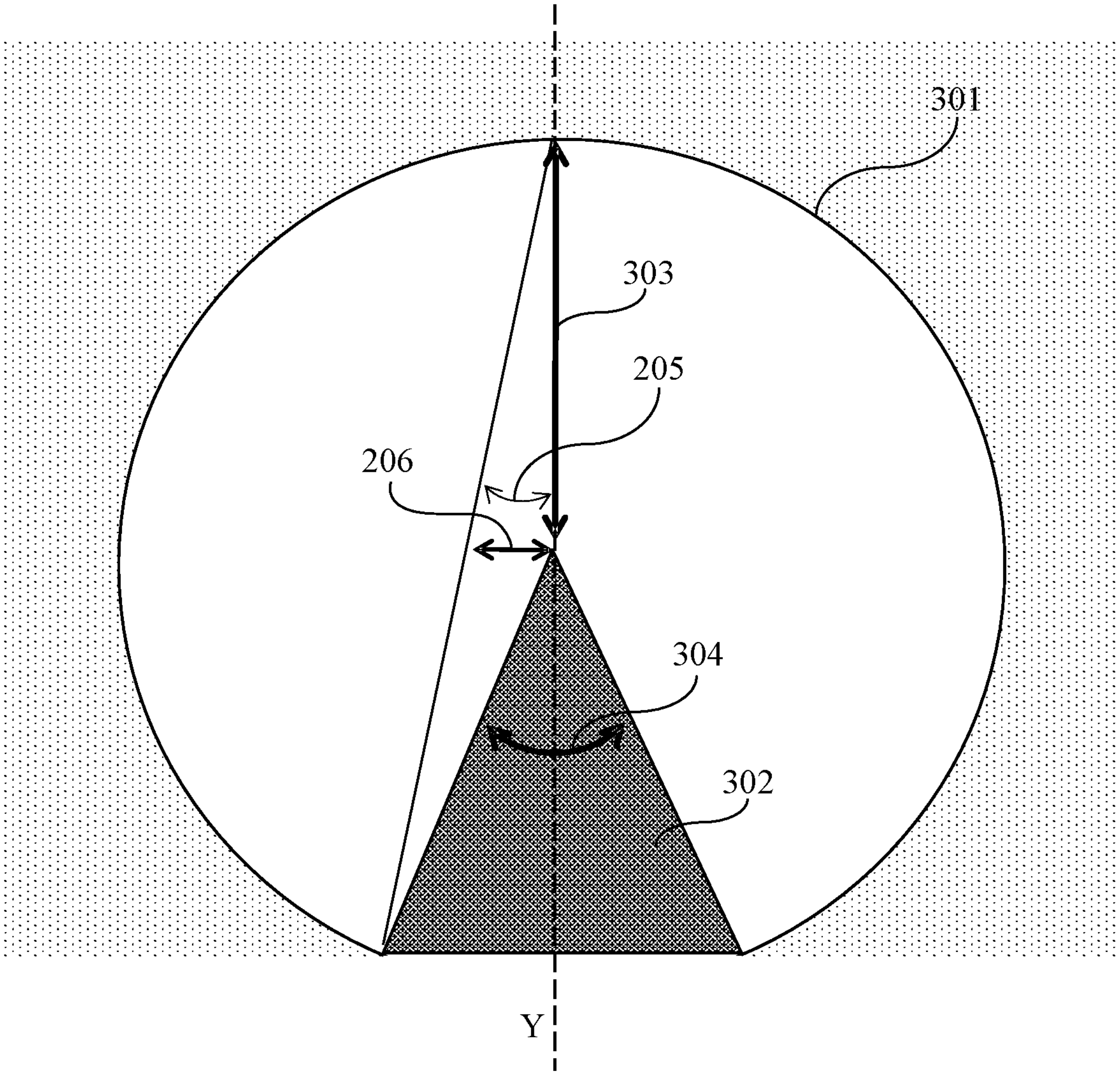
FIG. 3 is a sectional view illustrating a measurement range of the three-dimensional scanner according to each embodiment.

The mirror plane angle 203 is determined, for example, according to the angle of the blind spot of the three-dimensional laser scanner 100 and the shortest measurement distance required by the designer. FIG. 3 is a sectional view illustrating the measurement range of the three-dimensional laser scanner 100. In FIG. 3, the center of an arc indicates a measurement range 301 as the optical center of the three-dimensional laser scanner 100. In FIG. 3, reference numeral 301 denotes a measurement range, reference numeral 302 denotes a range of the blind spot of the three-dimensional laser scanner 100 caused by the housing shadow and a tripod, etc., reference numeral 303 denotes the shortest measurement distance, and reference numeral 304 denotes an angle of the blind spot of the three-dimensional laser scanner 100. Where Θ is the blind angle 304 of the three-dimensional laser scanner 100, L is the shortest measurement distance 303, Φ is a reflection optical axis angle 205, and r is the mirror plane angle 203. The reflection optical axis angle Φ and the mirror plane angle r are calculated using the following equations (1) and (2), respectively:

$$\Phi = \tan^{-1}\left(\frac{L\tan\frac{\theta}{2}}{2L}\right) = \tan^{-1}\left(\frac{1}{2}\tan\frac{\Theta}{2}\right) \tag{1}$$

$$r = \frac{\frac{\pi}{2} - \Phi}{2} \tag{2}$$

Figure 4:
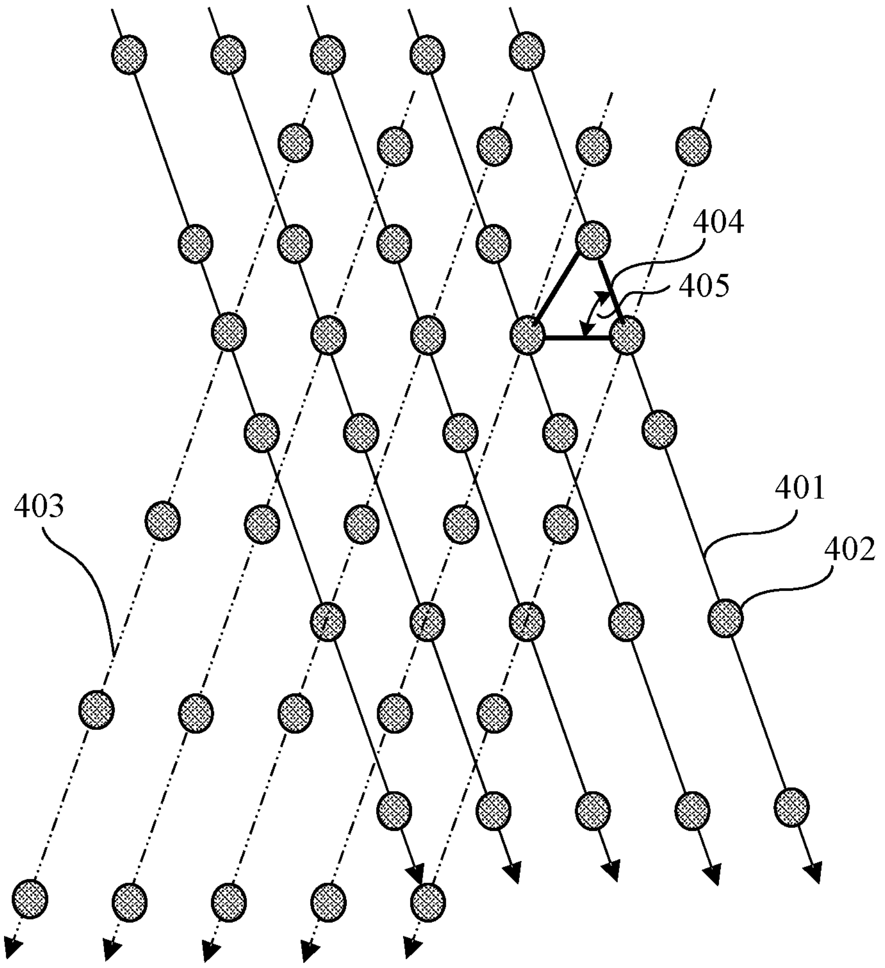
FIG. 4 illustrates a grid shape and scanning lines of point cloud data in each embodiment.

The mirror plane angle 203 may be determined according to the shape of the grid polygon of the measurement point cloud (measured point cloud data) required by the designer. FIG. 4 illustrates the grid shape and scanning lines of the point cloud data, and more specifically illustrates the grid shape and scanning lines of the point cloud obtained while the three-dimensional laser scanner 100 measures a certain surface. In FIG. 4, reference numeral 401 denotes a scanning line of a laser beam when the mirror is rotated by 0° to 180° in the horizontal direction, and reference numeral 402 denotes a measurement point at that time. Reference numeral 403 denotes a scanning line of a laser beam when the mirror is rotated by 180° to 360° in the horizontal direction, and reference numeral 404 denotes a grid polygon generated at that time. An angle 405 formed by the side of the scanning line in the grid polygon 404 and the straight line connecting the measurement points in the horizontal direction is equal to the reflection optical axis angle 205. Therefore, the reflection optical axis angle 205 can be determined by the designer who determines the grid shape. Where Φ is the reflection optical axis angle 205 and r is the mirror plane angle 203, the mirror plane angle 203 is calculated by the equation (2).

The offset 206 is determined, for example, according to the reflection optical axis angle 205 and the shortest measurement distance 303. Where Φ is the reflection optical axis angle 205, Lis the shortest measurement distance 303, and d is an offset 206, the offset d is calculated by the following equation (3):

$$d = L\tan\Phi \tag{3}$$

In order to secure the effect of this embodiment, the reflection optical axis angle Φ (°) may satisfy the following inequality (4):

$$5° \leq \Phi \leq 60° \tag{4}$$

The numerical range of inequality (4) may be set as illustrated in inequality (4a) below:

$$10 \leq \Phi \leq 45 \tag{4a}$$

Figure 5A:
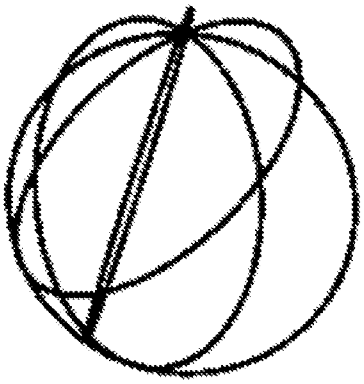
FIGS. 5A, 5B, and 5C illustrate examples of scanning lines of the three-dimensional laser scanner according to each embodiment.
Figure 5B:
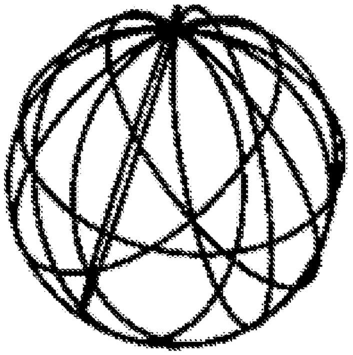
Figure 5C:
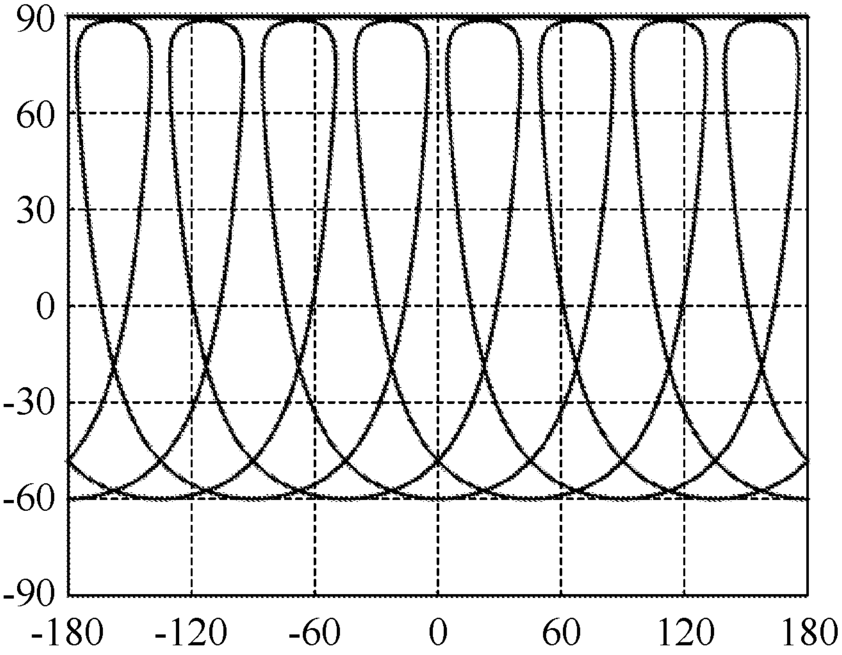

FIGS. 5A, 5B, and 5C illustrate examples of point cloud scanning lines of the three-dimensional laser scanner 100 according to this embodiment. In FIGS. 5A, 5B, and 5C, the density in the horizontal direction is reduced so that the shape of the scanning line becomes clear. FIGS. 5A and 5B schematically illustrate a pattern of scanning lines formed on a surface of a transparent sphere (virtual sphere) with an arbitrary radius around the rotary mirror 7 as a center. FIG. 5A illustrates the scanning lines of the laser beam while the mirror is rotated by 0° to 180° in the horizontal direction, and FIG. 5B illustrates the scanning lines of the laser beam while the mirror is rotated by 0° to 360° in the horizontal direction. FIG. 5C illustrates the scanning lines on the virtual spherical surface of FIG. 5B in a plane using the conformal cylindrical projection (Mercator projection). Similarly to a general map, the longitude is illustrated in the horizontal direction from −180° to 180°, and the latitude is illustrated in the vertical direction from −90° to 90°.

As illustrated in FIGS. 5A, 5B, and 5C, the points where the scanning lines intersect are spread over the latitude on the conformal cylindrical projection, rather than at −90° or 90°, and thus this embodiment can reduce the unevenness by increasing the density of point cloud data. In other words, by providing a slope and offset to the mirror plane and by rotating it by 0° to 360° about the X-axis and the Y-axis at a constant speed, the high-density point cloud data in which the density unevenness is suppressed can be acquired without the need for complex motor control.

Figure 6A:
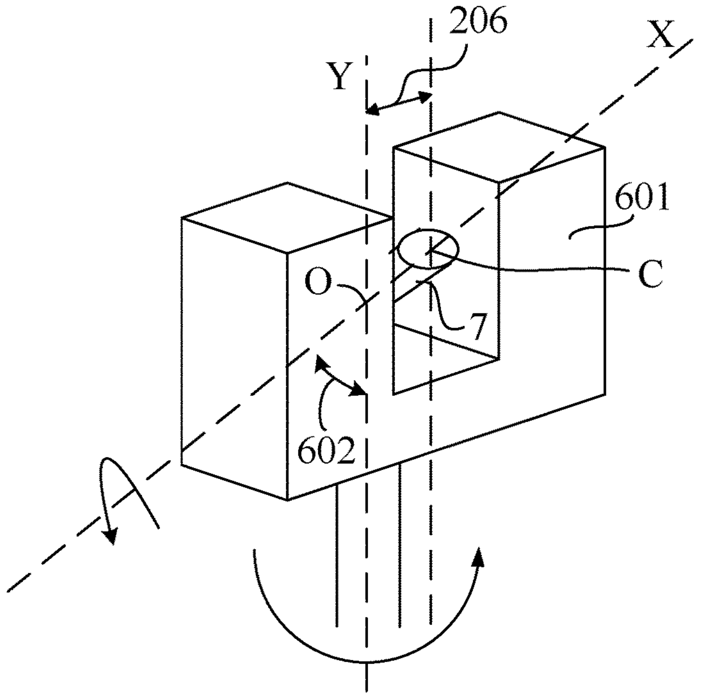
FIGS. 6A and 6B illustrate a positional relationship among a rotary mirror, a housing, and a laser beam in a second embodiment.
Figure 6B:
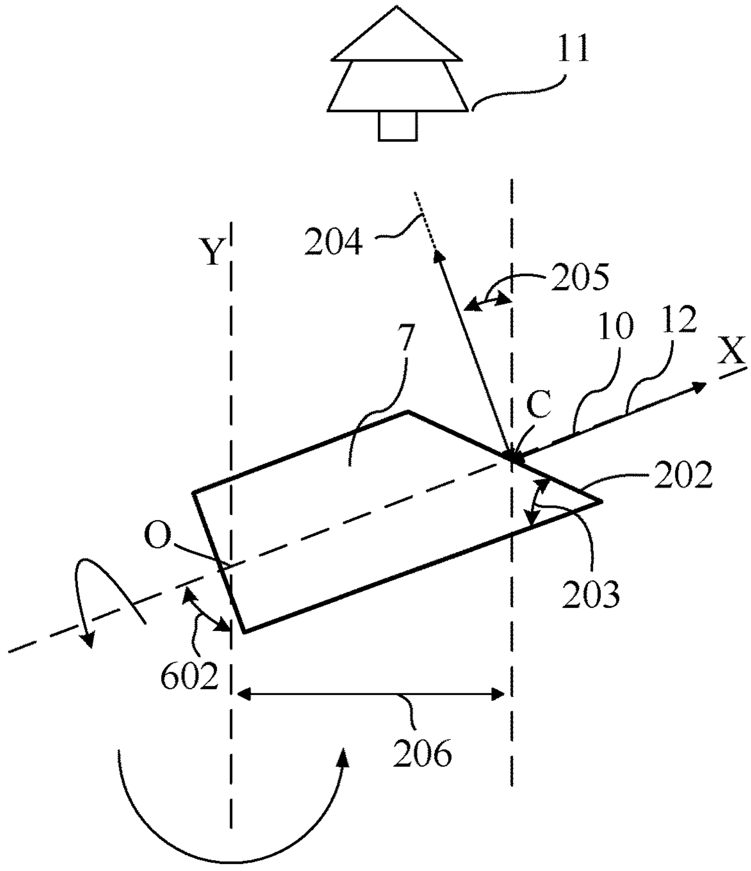
Figure 7A:
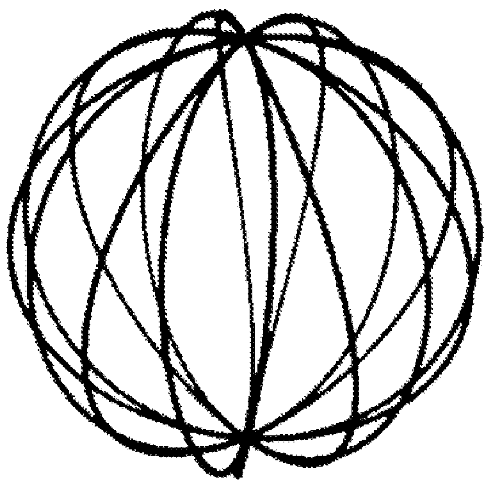
FIGS. 7A and 7B illustrate examples of scanning lines of a three-dimensional laser scanner according to a comparative example.
Figure 7B:
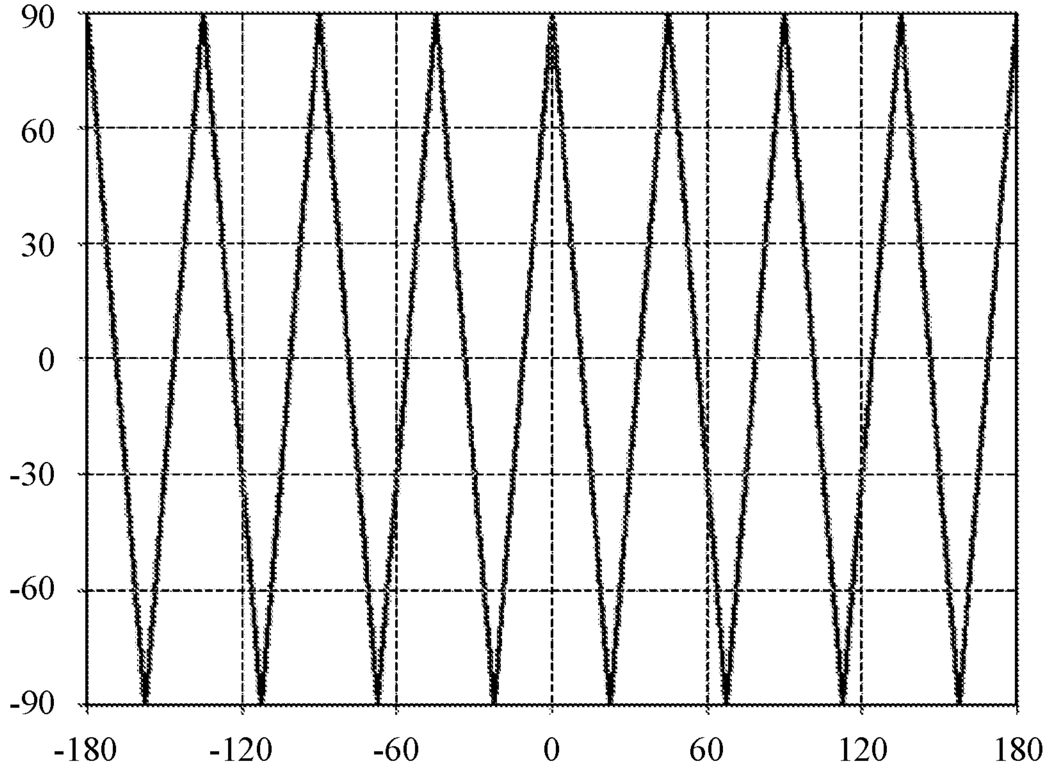

Referring now to FIGS. 7A and 7B, a description will be given of a comparative example. FIGS. 7A and 7B illustrate an example of scanning lines of a three-dimensional laser scanner according to a comparative example (such as a configuration disclosed in Japanese Patent Laid-Open No. 2017-156142). FIG. 7A illustrates the scanning lines obtained by rotating the three-dimensional laser scanner by 360 degrees in the horizontal direction to obtain point cloud data. Similarly to FIGS. 6A and 6B, the scanning lines are drawn on the surface of the virtual sphere. Similarly to FIG. 5C, FIG. 7B is a plan view expressed in the conformal cylindrical projection. In FIG. 7B, the horizontal direction indicates the longitude from −180° to 180°, and the vertical direction indicates the latitude from −90° to 90°. As illustrated in FIG. 7B, it is understood that the scanning lines of the point cloud data that are zigzag causes areas with high and low point cloud density. More specifically, the point cloud data on the equator (latitude) 0° is recorded at approximately regular intervals, and the point cloud data at other latitudes are not recorded at regular intervals.

Second Embodiment

A description will now be given of a second embodiment. Referring now to FIGS. 6A and 6B, a description will be given of a positional relationship among the rotary mirror 7, a housing 601, and a laser beam in this embodiment. FIG. 6A illustrates a positional relationship between the rotary mirror 7 and the housing 601 in this embodiment. FIG. 6B illustrates a positional relationship between the rotary mirror 7 and the laser beam.

In FIG. 6A, the rotary mirror 7 is disposed in the housing 601 at a position where the rotation center axis (X-axis) of the rotary mirror 7 is tilted by an axis angle 602 relative to the Y-axis and shifts by an offset 206 from the Y-axis. A description will now be given of the axis angle 602 and offset 206. The mirror plane 202 of the rotary mirror 7 has a mirror plane angle 203 of 45 degrees. Thereby, the incident angle and reflection angle of the laser beam 10 and the reflected light 12 can be determined to be 45°. That is, the reflection optical axis 204 is orthogonal to the X-axis. In this state, by setting the axis angle 602 to an arbitrary angle, the reflection optical axis angle 205 is changed according to the axis angle 602. Where a reflection optical axis surface is a trajectory surface including the reflection optical axis 204 while the reflection optical axis 204 is rotated by 360 degrees about the X-axis, the reflection optical axis surface does not become parallel to the plane including the Y-axis in a case where the reflection optical axis angle 205 has a value other than 0°. In addition, by shifting a straight line parallel to the Y-axis passing through the center point C on which the laser beam 10 and the reflected light 12 of the mirror plane 202 are reflected, from the Y-axis by the offset 206, the center point C of the mirror plane 202 is not located on the Y-axis (the center point C of the mirror plane 202 is offset from the Y-axis).

The axis angle 602 may be determined according to the angle of the blind spot of the three-dimensional laser scanner 100 and the shortest measurement distance required by the designer. As illustrated in FIG. 3, where Φ is the reflection optical axis angle 205, the reflection optical axis angle Φ is calculated by equation (1). Where s is the axis angle 602, the axis angle s is calculated by the following equation (5):

$$s = \frac{\pi}{2} - \Phi \tag{5}$$

Alternatively, the axis angle 602 may be determined based on the shape of the grid polygon of the measurement point cloud required by the designer. The angle 405 formed by the side of the scanning line in the grid polygon 404 in FIG. 4 and the straight line connecting the measurement points in the horizontal direction is equal to the reflection optical axis angle 205. Therefore, the reflection optical axis angle 205 can be determined by determining the grid shape.

In this embodiment, the offset 206 can be determined by the same method as that of the first embodiment, and a description thereof will be omitted. In addition, in this embodiment, the coordinates of the scanning lines are the same as those of the first embodiment, and the density and interval of the point cloud data are the same, so a description of the scanning line will be omitted in this embodiment.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an optical apparatus that can acquire high-density point cloud data at approximately regular intervals.

This application claims priority to Japanese Patent Application No. 2023-072049, which was filed on Apr. 26, 2023, and which is hereby incorporated by reference herein in its entirety.

What is claimed is:

1. An optical apparatus comprising:

a mirror configured to irradiate light onto a target and to guide reflected light from the target;

a first motor configured to rotate the mirror about a first axis;

a second motor configured to rotate the mirror about a second axis; and a processor configured to control the first motor and the second motor, wherein an intersection of the first axis and a reflective surface of the mirror is located at a position different from the second axis, wherein a reflection optical axis surface including a reflection optical axis as an optical axis of the reflected light passing through the intersection of the reflective surface is not parallel to a plane including the second axis, and wherein a positional relationship between the reflection optical axis surface and the plane including the second axis is determined according to an angle of a blind spot of the optical apparatus.

2. The optical apparatus according to claim 1, wherein the reflection optical axis surface is a trajectory surface while the mirror is rotated by 360° about the first axis.

3. The optical apparatus according to claim 2, wherein the following inequality is satisfied:

$$5° \le \Phi \le 60°$$

where Φ is an angle between the second axis and the reflection optical axis on a plane including the first axis and the second axis.

4. The optical apparatus according to claim 1, wherein the positional relationship is determined according to a shape of a grid polygon of point cloud data.

5. The optical apparatus according to claim 1, wherein a positional relationship between the intersection of the reflective surface and the second axis is determined according to the positional relationship between the reflection optical axis surface and the plane including the second axis, and a shortest measurement distance of the optical apparatus.

6. The optical apparatus according to claim 1, wherein the processor is configured to determine the positional relationship between the reflection optical axis surface and the plane including the second axis by changing a slope of the reflective surface.

7. The optical apparatus according to claim 1, wherein the first axis and the second axis are orthogonal to each other.

8. The optical apparatus according to claim 1, wherein the processor is configured to determine the positional relationship between the reflection optical axis surface and the plane including the second axis by changing a slope of the first axis.

9. The optical apparatus according to claim 1, wherein the processor is configured to acquire point cloud data of the target by rotating the mirror using the first motor and the second motor.

10. The optical apparatus according to claim 1, wherein the optical apparatus is a three-dimensional laser scanner.

11. A control method of an optical apparatus, the control method comprising:

a first step of irradiating light onto a target using a mirror and of guiding reflected light from the target while rotating the mirror using a first motor and a second motor;

a second step of receiving the reflected light guided by the mirror with a light receiver to obtain distance data to the target, wherein the first motor rotates the mirror about a first axis, wherein the second motor rotates the mirror about a second axis, wherein an intersection of the first axis and a reflective surface of the mirror is located at a position different from the second axis, wherein a reflection optical axis surface including a reflection optical axis as an optical axis of the reflected light passing through the intersection of the reflective surface is not parallel to a plane including the second axis and wherein a positional relationship between the reflection optical axis surface and the plane including the second axis is determined according to an angle of a blind spot of the optical apparatus.

12. A non-transitory computer-readable storage medium storing a program that causes a computer to execute the control method according to claim 11.

* * * * *